United States Patent [19]

Rielley et al.

[11] Patent Number: 4,469,710

[45] Date of Patent: Sep. 4, 1984

[54] POURABLE SOLID SHORTENING

[75] Inventors: Ronald A. Rielley, Gateshead, England; Kenneth W. Krause, Fairfield, Ohio; Steve G. Fishter, West Harrison, Ind.

[73] Assignee: The Procter & Gamble Company, Cincinnati, Ohio

[21] Appl. No.: 434,440

[22] Filed: Oct. 14, 1982

[51] Int. Cl.$^3$ .............................................. A23D 5/00
[52] U.S. Cl. ................................... 426/541; 426/607; 426/608; 426/609; 426/417; 426/517
[58] Field of Search ................. 426/98, 586, 601, 609, 426/606, 607, 608, 417, 516, 517, 98, 541

[56] References Cited

U.S. PATENT DOCUMENTS

| | | |
|---|---|---|
| 1,231,114 | 6/1917 | Atkinson . |
| 1,286,903 | 12/1918 | Atkinson . |
| 1,329,845 | 2/1920 | Overbeck . |
| 2,555,902 | 6/1951 | Salo et al. ............................ 426/554 |
| 2,694,643 | 11/1954 | Robinson et al. ...................... 426/98 |
| 2,913,342 | 11/1959 | Cameron et al. .................... 426/609 |
| 3,240,607 | 3/1966 | Davies et al. .................... 426/601 X |
| 3,383,219 | 5/1968 | Patterson ............................... 426/98 |
| 3,388,997 | 6/1968 | Schaible et al. ..................... 426/556 |
| 3,393,075 | 7/1968 | Hayashi et al. . |
| 3,396,035 | 8/1968 | Kessinger . |
| 3,449,133 | 6/1969 | Dobson et al. ................. 426/601 X |
| 3,514,297 | 5/1970 | Campbell et al. . |
| 3,585,046 | 6/1971 | Schaible et al. . |
| 3,612,131 | 10/1971 | Carnahan . |
| 3,671,264 | 6/1972 | Drews et al. . |
| 3,754,961 | 8/1973 | Ueno et al. ............................ 117/16 |
| 3,796,814 | 3/1974 | Cermak .................................. 426/98 |
| 3,892,880 | 7/1975 | Grolitsch ........................ 426/607 X |
| 3,973,046 | 8/1976 | Mol . |
| 3,973,053 | 8/1976 | Galusky et al. ..................... 426/601 |
| 4,086,367 | 4/1978 | Ziccarelli ............................. 426/98 |
| 4,163,066 | 7/1979 | Mason et al. ................... 426/609 X |
| 4,232,052 | 11/1980 | Nappen ................................ 426/601 |
| 4,343,826 | 8/1982 | McNaught ......................... 426/601 |

FOREIGN PATENT DOCUMENTS 56682 7/1982 European Pat. Off. .
1591102 6/1981 United Kingdom .

Primary Examiner—Robert Yoncoskie
Attorney, Agent, or Firm—Nancy S. Mayer; Rose Ann Dabek; Richard C. Witte

[57] ABSTRACT

A pourable solid shortening composition comprising segments of solid fats wherein the solids content index is a minimum of 15% at 110° F. and a maximum of 78% at 92° F. as denoted by area CGH on FIG. 1 is disclosed. The shortening is processed into a form sufficiently thermodynamically stable to resist agglomeration under high temperature of shipping and storage, yet is suitable for use in cooking. A method for the preparation of such shortenings requires the specific selection of starting materials, processing conditions, and particle size and shape.

17 Claims, 5 Drawing Figures

WAXINESS vs AGGLOMERATION

SOYBEAN OIL STARTING MATERIAL

SHORTENING AFTER 3 DAYS TEMPERING

SHORTENING AFTER 6 DAYS TEMPERING

SHORTENING AFTER MELTING FOR COOKING

POURABLE SOLID SHORTENING

BACKGROUND OF THE INVENTION

This invention relates to a new and improved shortening composition. In particular, it relates to a pourable solid shortening wherein the solids content index is a minimum of 15% at 110° F. and a maximum of 78% at 92° F. as denoted by area CGH on FIG. 1. The composition is processed into a form sufficiently thermodynamically stable to resist melting and agglomeration at elevated storage temperatures, yet retains excellent cooking qualities. The preparation of such shortenings requires the specific selection of starting materials, processing conditions, and particle size and shape.

Practically all pourable solid frying fats which have been produced previously in powdered, flaked, or particle form have a tendency, particularly after storage at room temperature for a short time, to become sticky and to form lumps which are not easily broken apart. The powder particles or flakes agglomerate to form larger lumps or a solid mass. This tendency is increased by exposure to high storage temperatures, and can result in the melting of particulate fats suitable for cooking. Refrigerated storage can be employed to help prevent agglomeration and melting, but is not always practical. These problems of agglomeration upon storage have been countered primarily by three means: (1) encapsulation or enrobing; (2) use of high-melting fat materials; and (3) tempering processes.

Encapsulation or enrobing provides a protective coating around a low melting material. Often a higher melting fat is used as the encapsulating material, thereby containing any melting of the encapsulated material. Thus, agglomeration or caking of the product upon prolonged storage is decreased. The encapsulation technique has been successfully applied for a variety of protective purposes such as prevention of moisture absorption, delay of reaction of active components, prevention of elution of a specific entity until heated to a minimum temperature, etc. However, encapsulation to avoid agglomeration of fat particles at common storage temperatures is not always adequate. It has been necessary to use anti-caking agents in some cases in combination with encapsulation to increase the effectiveness of the technique. See U.S. Pat. Nos. 3,754,961 issued to Ueno et al on Aug. 28, 1973, and 3,388,997 issued to Schaible et al on June 18, 1968. U.S. Pat. No. 4,343,826 issued to McNaught on Aug. 10, 1982 discloses a process for preparing beaded fats wherein a coating is not deemed necessary, but the packed beads are transferred promptly to a cooled area for storage at 40° to 50° F. to avoid clumping.

A second approach to storage agglomeration problems of particucate fats is simply the use of high melting fatty materials and/or flow conditioning agents. The selection of fats that are highly hydrogenated (low iodine values), and therefore have high-melting point ranges aids in the prevention of agglomeration, but highly hydrogenated fats are not suitable for all shortening uses. Flow conditioning or anti-caking agents are also commonly employed with the high-melting materials. However, such additives may also render the shortening unsuitable for a particular desired end use by adversely affecting factors such as baking, smoking or foaming properties of the shortenings.

A final means utilized to help prevent storage agglomeration problems has been to employ tempering processes to convert fat crystals to their more stable polymorphic phase prior to storage and thereby avoid the evolution of heat of crystal transformation during storage. It is known that crystallizable fatty materials exhibit polymorphic crystal behavior, i.e., they can exist in different distinct crystalline forms known as alpha, alpha-prime, beta, beta-prime, etc., arising from different patterns of molecular packing in the crystal. Background information in the polymorphic phase structure of edible fats can be found in U.S. Pat. Nos. 2,521,242 and 2,521,243 issued Sept. 5, 1950 to Mitchell; Ferguson and Lutton, Chem. Rev. 29, 355 (1941); Lutton, J. Am. Chem. Soc., 67, 524 (1945); and Lutton, J. Am. Oil. Chem. Soc., 27, 276 (1950). The crystal form obtained is dependent upon the temperature and speed at which crystallization is permitted to take place. The least stable crystalline forms, alpha and beta prime, tend to form upon rapid chilling of a molten fat. Transformation of these lower melting alpha and beta-prime crystals to the more thermodynamically stable beta form can occur over extended periods of time. Crystal transformation is accompanied by evolution of heat.

The prior art (see U.S. Pat. No. 3,973,053 issued to Galusky et al on Aug. 3, 1976) discloses a process for quick tempering of solid fat powders by agitating the particulate fat in a gas fluidized bed at 50° F. to 80° F. The cooling gas absorbs the heat of crystal transformation of the particulates. Also known is a method for manufacturing fat powders by spray drying wherein the fat is first held within a specific temperature range, i.e. between the congeal point and the melting point of the fat, to promote beta crystal formation prior to the spraying process, and then held at 32° F. to 50° F. for a period after spray drying (see U.S. Pat. No. 3,892,880 issued to Grolitsch on July 1, 1975). The powders are said to retain flowability after long storage at room temperature. The problems encountered in storage at elevated temperatures were not addressed.

Shortening compositions with high melting point ranges having a solid fat content high enough to retain particle integrity at high storage temperatures are believed to impart a waxy or greasy taste to food cooked therein. A solid coating is formed on the food as it cools to below the high melting point range of a substantial percentage of the fats in the shortening. For this reason, shortening compositions with lower melting point ranges, particularly those available in liquid or solid block form, have been extensively used for cooking. A composition which has both a high melting point range to prevent agglomeration on storge and a low melting point range at food eating temperatures to help prevent a greasy taste perception on food cooked therein is highly desirable. Such a product is provided by the present invention.

The shortening compositions of the present invention are advantageous in minimizing the solid coating of shortening formed on food as it cools, as compared to that formed on food cooked in a highly hydrogenated fat, i.e. fats with a solids content index greater than 78% at 92° F. This is especially important with regard to the presence of a greasy or waxy taste perception since many fried foods, such as chicken, are often eaten after cooling. The appearance of the cooled food is also improved because of the reduced development of a waxy coating. Thus, leftover fried food or fried food eaten after it has cooled retains its initial appealing appearance and organoleptic qualities when cooked in the shortening compositions of the present invention.

Currently available solid block cooking shortenings present handling problems when used in large volumes such as in restaurant or institutional cooking. Due to its pourable form, the shortening composition of the present invention promotes safety, improves convenience, and eliminates waste. When used in large volumes uneven packing of solid shortening into electric kettles can cause isolated hot spots to occur in the electric coils which may lead to a flash fire. This is commonly avoided by premelting solid blocks of shortening and transferring the hot liquid shortening into the desired cooking vessel. Upon adding the shortening composition of the present invention to the cooking vessel, it distributes evenly thoughout the kettle. The possibility of flash fires is greatly decreased, thus increasing safety. Eliminating the need to premelt solid shortening and transport the hot liquid further improves safety.

Due to its pourable form the shortening composition of the present invention improves convenience by eliminating the need to remove solid shortening from bulk containers by scooping and dipping. It provides the convenience of a liquid but without the disadvantages of liquid products such as messy containers and spilling. Currently available solid shortenings often stick to their container necessitating time consuming effort to obtain complete removal. Likewise, complete removal of liquid shortenings from their containers entails a draining period, and often requires slight heating of the container to decrease the viscosity of the liquid. The shortening composition of the present invention pours quickly and conveniently from its container with no residue left behind. Time-consuming effort and product waste are avoided. These advantages translate into lower costs for the consumer while still providing high quality food.

Accordingly, it is an object of this invention to provide a pourable solid shortening which is storage stable at elevated temperatures and yet suitable for cooking.

Another object of this invention is to provide a shortening of good organoleptic quality in solid pourable form.

Another object of this invention is to provide a solid shortening that is safer for use in large volumes.

Another object of this invention is to provide a shortening that is more convenient to use and can be easily used without waste.

Another object of this invention is to provide a solid shortening in pourable form with a thermodynamically stable solid fat content to avoid significant agglomeration at storage temperatures up to 110° F., but which when used in cooking provides excellent organoleptic quality of food prepared with it. The food does not have a waxy or greasy taste perception.

These and other objects will become apparent from the following description and examples. All percents are by weight unless otherwise specified.

SUMMARY OF THE INVENTION

A new and improved shortening composition has been discovered comprising a pourable pelletized solid shortening capable of resisting agglomeration under high storage temperatures, but which is suitable for cooking with excellent organoleptic quality of the resultant cooked food. More specifically, the shortening comprises segments of pourable solid edible fats wherein the solids content index is a minimum of 15% at 110° F. and a maximum of 78% at 92° F. and which has properties within the denoted area CGH on FIG. 1. Storage stability is obtained via processing. If not inherent in the product after processing, the melting point range of the fat can be shifted to a higher temperature range through tempering. Upon use of the fat in cooking the solid crystal structure is destroyed by melting. As the food cools, crystallization of the fat coating on the food is in the least stable thermodynamic state and therefore it crystallizes at a lower temperature range. Crystallization is thereby delayed until the food cools to this lower temperature range. This minimizes the greasy or waxy taste perception of the cooked food as compared to food cooked in a highly hydroganated fat, i.e. a fat with a solids content index above 78% at 92° F.

The fats used to prepare the shortening composition comprise triglycerides of saturated or unsaturated monocarboxylic acids having 10 to 28 carbon atoms, preferably those derived from vegetable oil. Preparation of a shortening composition with the above properties requires the specific selection of starting materials, processing conditions, and particle size and shape. Although any of several methods can be used, the preferred process comprises one wherein (A) the starting materials are hydrogenated fats or blends of fats of different iodine values, (B) the hardened triglycerides are heated to a temperature above the melting point of the mixture of fats contained therein to obtain a homogeneous molten fat composition, (C) the heated fat composition is chilled rapidly to crystallize sufficiently for further processing, (D) the crystallized fat is extruded into small segments or pieces, and (E) optionally, the fat segments are tempered at about 85° F. to about 95° F. for up to six days (144 hours).

The fat compositions of the present invention comprise those with a minimum solids content index of 15% at 110° F. and a maximum solids content index of 78% at 92° F. Vertical line CD depicts a solids content index of 15% at 110° F. Compositions with a solids content index less than 15% at 110° F. are not suitable for the present invention due to unacceptable levels of agglomeration upon storage at 110° F. Area ACDE represents these unacceptable compositions. Points X and Y represent the current leading solid shortening and the current leading liquid shortening respectively. Horizontal line FG depicts a solids content index of 78% at 92° F. Compositions having a solids content index greater than 78% at 92° F. are not suitable for the present invention due to degradation of food cooked therein via an unacceptable greasy waxy taste perception. Area EFGB represents these compositions.

Compositions within triangle CGH represent the present invention and are capable of resisting agglomeration under high storage temperatures, and yet are suitable for cooking with acceptable organoleptic quality of the resultant cooked food. Those compositions within are KJI are preferred for the present invention due to the greater decrease in greasy or waxy taste perception which occurs as the waxiness index is decreased, and the greater decrease in agglomeration which occurs as the agglomeration index is increased. Horizontal line IJ represents a solids content index of 63% at 92° F. Compositions with waxiness indices at 63% and below at 92° F. were preferred in food quality testing. Vertical line KI represents a solids content index of 24% at 110° F. Compositions with agglomeration indices of 24% and above at 110° F. were categorized in the preferred range in agglomeration tests. The unlabeled points represent the solids content index at 110° F. after 6 days tempering and at 92° F. with no tempering for various compositions described in Examples I and II.

FIGS. 2 to 5 represent the effects of processing, tempering, and melting for cooking on the melting point range of a polymorphic starting material. Non-beta-tending starting material that does not require tempering will not progress through the properties represented by these figures.

FIGS. 2, 3, 4 and 5 each depict a melting profile generated by differential scanning calorimetry (hereinafter denoted as DSC). DSC is used to determine and compare the melting behavior of fat samples with various compositional and polymorphic crystalline differences. The amount of energy absorbed directly correlates to the amount of solids melting. Characterization of a fat is determined by comparisons of the temperatures at which transformations in the physical form occur.

Figure 2:
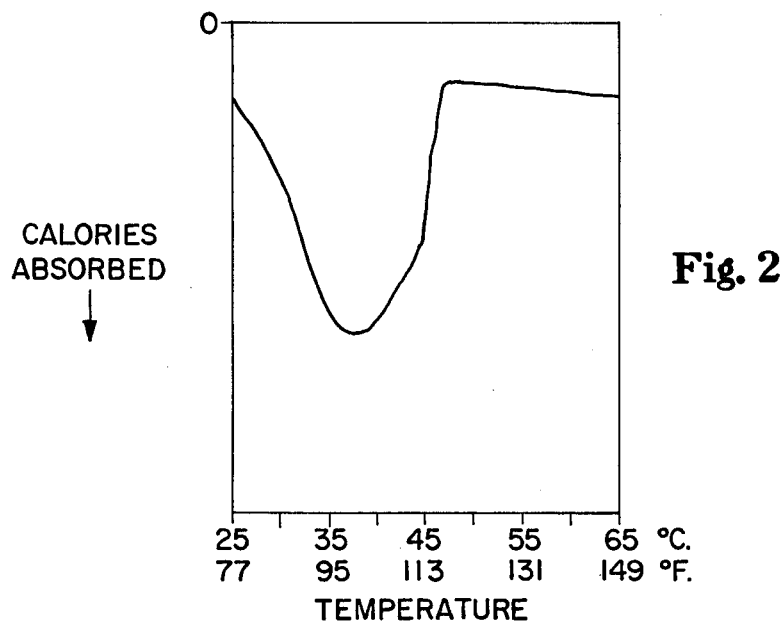
Figure 3:
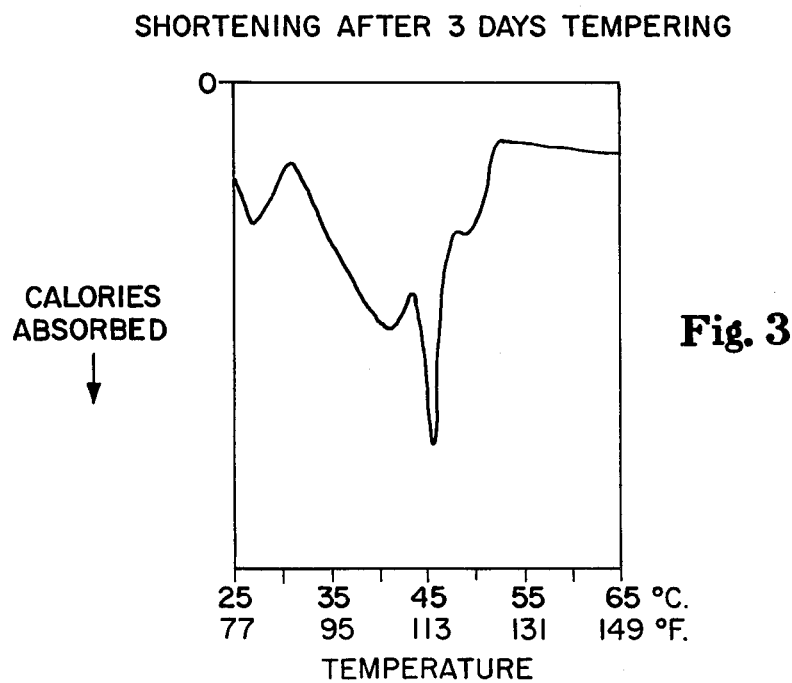
Figure 4:
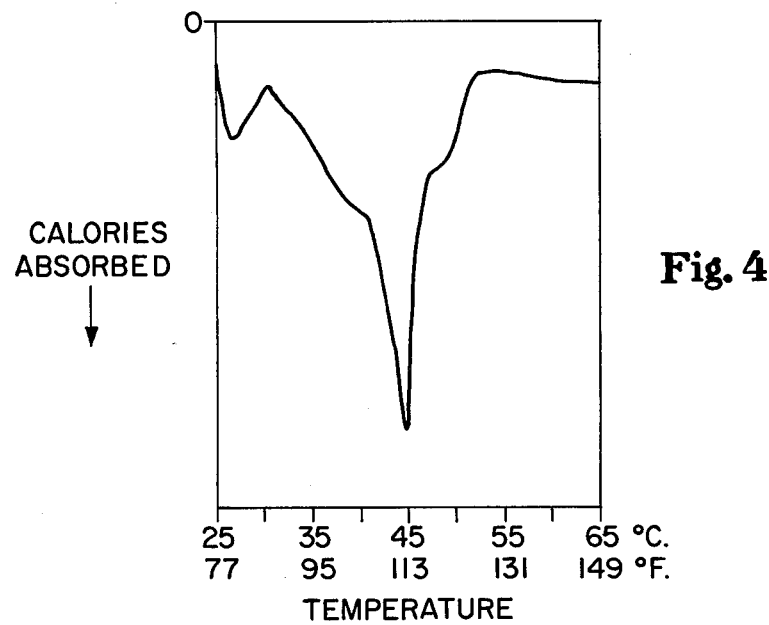

FIG. 2 represents the melting profile of untempered solid soybean oil, a polymorphic starting material which can be used to prepare the present invention. FIGS. 3 and 4 represent the melting profiles of the pourable solid shortening generated from the soybean oil of FIG. 2 after processing and after 3 and 6 days tempering at 90° F.±5° F., respectively. Comparisons of FIG. 2 with FIGS. 3 and 4 show a shift of the melting point range to a higher temperature range. This result occurs due to the processing and tempering of the present invention. Comparison of FIGS. 3 and 4 show the effect of additional tempering time.

Figure 5:
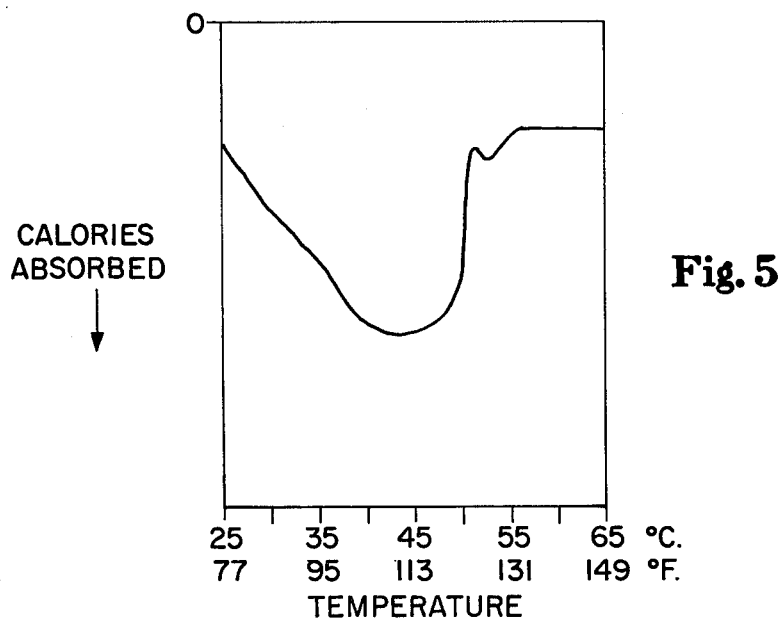

FIG. 5 represents the melting profile of the shortening of FIGS. 3 and 4 after melted for use in cooking as it would solidify on the cooked food. Comparisons of FIGS. 3 and 4 with FIG. 5 show a shift of the melting point range back to a lower temperature range. This occurs due to melting of the polymorphic fat for use in cooking. Processing to the higher melting phase of FIGS. 3 and 4 provides stability during shipping and storage at elevated temperatures, while shifting the melting point range back to a lower temperature range upon cooking use as shown in FIG. 5 helps assure good organoleptic quality of food cooked therein. The food must cool to a lower temperature before crystallization of the shortening occurs on the surface of the food.

DESCRIPTION OF PREFERRED EMBODIMENTS

Product Characteristics

The pourable solid segments of the shortening composition of the present invention comprise edible fats wherein:

(a) the solids content index of the shortening is a minimum of 15% at 110° F. such that significant agglomeration is resisted during shipping and storage, and (b) the solids content index of the shortening is a maximum of 78% at 92° F. such that food prepared using the shortening is acceptable in organoleptic quality.

Figure 1:
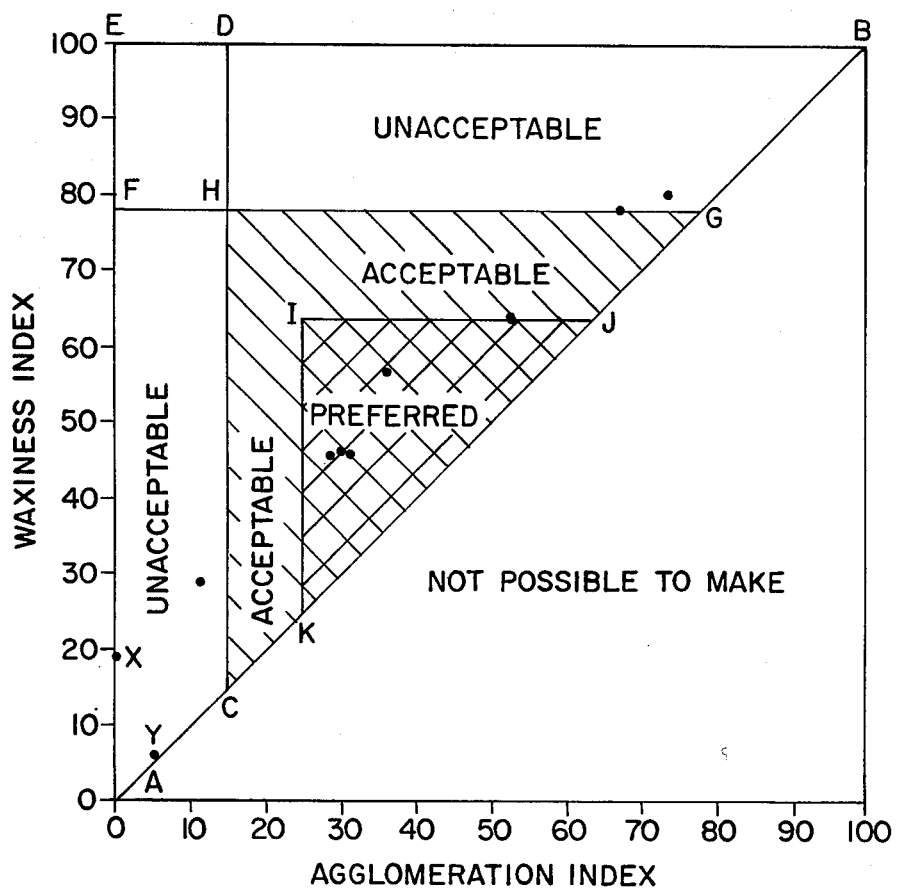
FIG. 1 depicts graphically as area CGH the compositions possessing the characteristics of the present invetion. The horizontal axis labeled "Agglomeration Index" represents the solids content index at 110° F., while the vertical axis labeled "Waxiness Index" represents the solids content index at 92° F. The solids content index of fats decreases with increasing temperatures due to melting of the solids. It is currently impossible to prepare a fat composition with more solids at 110° F. than at 92° F. Diagonal line AB delineates this borderline. The area below diagonal line AB represents compositions which cannot be prepared at present. The area above diagonal line AB represents compositions wherein the solids content is higher at 92° F. than at 110° F.

The fat can be hydrogenated or blended to have a unique solids content index curve so that it can be processed into the solid shortening segments. The shortening is denoted by area CGH on FIG. 1. Preferably, the solids content index is a minimum of 24% at 110° F. and a maximum of 63% at 92° F., as shown in FIG. 1 by area KJI. Compositions rated as within the preferred range in the food quality testing are those having a solids content index of 63% or less at 92° F. Compositions rated as within the preferred range in the agglomeration testing are those with a solids content index of 24% or more at 110° F. The most preferred composition, particularly for use in deep fat frying, comprises a beta-tending vegetable oil shortening wherein the solids content index is from about 24% to about 50% at 110° F., and the solids content index is from about 24% to about 50% at 92° F.

A minimum product solids content index of about 15% at 110° F. is necessary to avoid agglomeration at 110° F. Product with a minimum solids content index of 15% at 120° F. after tempering at 90° F.±5° F. for at least 72 hours (3 days) avoids agglomeration at 120° F. Those compositions with a solids content index of less than 15% at 110° F., and those with a solids content index of less than 15% at 120° F. that have not been tempered for the required time, agglomerate unacceptably.

Acceptable organoleptic quality is obtained with product having a solids content index up to about 78% at 92° F. Shortening compositions with higher solid fat levels are unsuitable since the food cooled therein has a greasy taste perception. Those compositions having a solids content index of 63% or less at 92° F. are preferred since waxiness is improved as solids decrease at 92° F.

The optimal particle size and shape aids in decreasing agglomeration at elevated temperatures by means of minimizing surface contact between segments. The segments may comprise discrete pieces of irregular shape and size, discrete pieces substantially uniform in shape and size, or mixtures thereof. The most suitable forms were found to be substantially uniform cylinders or spheres. If spheres are generated, a diameter of ⅛ to 1 inch is appropriate, with ½ inch being preferred. The preferred form was found to be that of a cylinder with a diameter of about ⅛ inch to about 2 inches, preferably ¼ inch, and a height of about ⅛ inch to about 2 inches, preferably ⅜ inch.

Materials Employed

The starting material for preparation of the shortening of the present invention comprises edible fats and oils, and mixtures thereof. Any of a variety of glyceride base fat materials can be used in the present invention provided that the solids content is such as to be suitable for use in cooking foods. The starting fats should have been refined, bleached and may optionally be deodorized to remove off-flavors. Refining, bleaching and deodorizing are well-known processes and will not be described herein. Specific reference to such treatments can be found in D. Swern, Ed., *Bailey's Industrial Oil and Fat Products,* Third Edition, Interscience Publishers (1964).

The term "fat" used herein shall refer to edible fats and oils comprising triglycerides, fatty acids, fatty alcohols, and esters of such acids and alcohols. Especially appropriate for use in the present invention are triglycerides of straight chain or branched chain saturated or unsaturated monocarboxylic acids having from 10 to 28 carbon atoms. Suitable sources of such fats are: (1) vegetable fats and oils such as soybean, olive, corn, safflower, sunflower, cottonseed, canola, rapeseed, sesame seed, nasturtium seed, tiger seed, rice bran, wallflower, and mustard seed, (2) meat fats such as tallow or lard, (3) marine oils such as menhaden, pilcherd, sardine, whale, or herring, (4) nut fats and oils such as coconut, palm, palm kernel, babassu kernel, or peanut, (5) milk fats (butterfat, (6) cocoa butter and cocoa butter substitutes such as shea or illipe butter, and (7) synthetic fats.

The preferred starting materials are edible polymorphic vegetable fats, and mixtures thereof, comprising triglycerides having saturated or unsaturated acyl groups predominantly in the range of from 12 to 24 carbon atoms such as lauroyl, lauroleoyl, myristoyl, myristoleoyl, palmitoyl, palmitoleoyl, stearoyl, oleoyl, linoleoyl, arachidoyl, arachidonoyl, behenoyl, erucoyl, and the like. Branched chain saturated or unsaturated acyl groups are also useful herein. In particular, the preferred starting fat for deep fat frying comprises a blend of beta-tending vegetable oils.

A separate optional component of the shortening compositions of the present invention is a stabilizer to protect against oxidative deterioration at high temperatures, such as increases in viscosity and fatty acid content, formation of polymerized fatty matter, increase in refractive index, destruction of tocopherols, and intensification of foaming tendencies due to the formation of oxidized and polymerized constituents. Silicone oils, particularly methyl and ethyl silicones, are useful for this purpose. Suitable viscosities of the silicones are in the range of from about 50 to about 1,000,000, preferably from about 100 to about 1000 centistokes at 25° C. In the shortening compositions of the present invention it is appropriate to employ the silicone at a level of 0 to 10 ppm by weight, and 1 to 5 ppm by weight is preferred. Appropriate means must be used to assure substantially uniform dispersion of the small amount of silicone throughout the shortening composition. The silicone is added to the starting material after completion of the refining, bleaching and optional deodorizing processes.

Various other additives can be used in the shortenings of this invention provided that they are edible and aesthetically desirable and do not have a detrimental effect upon the melting and crystallization characteristics of the shortening. The types of additives employed should be consistent with the ultimate end use, which primarily comprises various types of frying or griddling, in particular, deep fat frying. The compositions of the invention can normally contain minor amounts of optional flavorings, emulsifiers, anti-spattering agents, or the like.

While not wishing to be bound by any theory, it is believed that the melting point range shifts effected in the present invention are a result of crystal transformation between polymorphic phases. The least stable alpha crystals tend to form upon rapid chilling of a molten fat. The shift of the melting point range to a higher range is believed to result from processing of the solid fat content of the composition into the more stable, higher melting beta polymorphic phase. Beta crystal formation occurs primarily during the tempering step of the process as will be shown in subsequent Examples. The beta phase crystals help provide the thermodynamic stability needed for storage at elevated temperatures. Upon melting of the fat segments for use in cooking, the beta crystal structure is destroyed. When the fat crystallizes upon the food as it cools, it goes into the less stable, lower melting alpha and beta-prime polymorphic phases.

Fats have been categorized in accordance with the overall tendency of their triglyceride solids to crystallize in a specific polymorphic phase as alpha-tending, beta-tending, and beta-prime-tending. As used herein, the term "beta-tending" denotes a triglyceride hardstock which has a propensity for crystallizing in the beta polymorphic phase rather than in either the alpha or beta-prime phases. The term "non-beta-tending" is used herein to denote triglyceride hardstocks with a propensity for crystallizing in either the alpha or beta-prime polymorphic phases. Triglyceride hardstocks known as beta-tending include fats and oils such as lard, sunflower seed oil, linseed oil, hazelnut oil, soybean oil, peanut oil, olive oil, corn oil, and other fats containing acyl groups of at least 8 carbon atoms. Non-beta-tending hardstocks include fats such as cottonseed oil, palm oil, tallow, whale and other fish oils, and other fats containing a substantial portion of acyl groups having 20 to 24 carbon atoms.

Both beta-tending and non-beta-tending fats can be used as starting materials for the present invention. However, beta-tending fats are preferred due to the higher melting point of the beta crystals formed in the solid shortening. The result is a product with a greater amount of solids at high temperatures which provides improved storage stability. Non-beta-tending materials require hardening to achieve a higher level of solids in the starting material. With non-beta-tending materials a higher level of solids, and the corresponding thermodynamic stability, cannot be achieved through tempering. This preference for the beta phase is in contrast to currently available solid shortenings which are formulated to contain a major amount of the beta-prime phase to provide a softer texture suitable for spooning or dipping in handling.

This theory is inadequate for those compositions prepared without the optional tempering step. As will be shown by subsequent Examples 6 and 8, shortening compositions with less than about 10% beta phase crystals present can be capable of resisting agglomeration at 110° F. to 120° F. and yet not impart a greasy or waxy taste to food cooked therein. It is believed this can be achieved due to the combination of starting material selection and processing. The solids content of fat varies with the fat chain length and with the degree of saturation. The selection of fats containing a high solids content, or hardening of the selected fat, will enable it to resist agglomeration at high storage temperatures without the presence of a large amount of beta phase crystals.

A fat containing a sufficiently high solids content may be obtained by either (1) hydrogenating, or by (2) blending of fats of different iodine values. Hydrogenation can be carried out by conventional methods and usually consists of a batch process whereby the fat composition is contacted with hydrogen in the presence of nickel catalyst. The solids content index of a fat also can be increased by adding to it a small amount of the corresponding fat with a low iodine value. The iodine value of a fat indicates the number of grams of iodine equivalent to the halogen absorbed by a 100 gram sample. In general, the lower the iodine value of a given fat, the greater will be its solids content at a given temperature, and the more saturated it will be. The iodine value can readily be determined by known methods. Although starting materials generated by either method are suitable for use in the present invention, blending of fats of different iodine values is preferred. Blending of starting materials of different iodine values allows greater flexibility in control of the melting profile.

In summary, beta-tending starting materials are most preferred. These, if necessary, may be hydrogenated or hardened by blending of fats of different iodine values. Of the suitable non-beta-tending starting materials those prepared by blending of fats of different iodine values are preferred to those prepared by hydrogenation.

Process Conditions

The shortening compositions of the present invention may be prepared using any of several methods. The preferred method of preparing the claimed compositions requires the specific selection of a combination of starting materials, processing conditions, and particle size and shape. This is accomplished through a process comprising:

(A) hydrogenating or hardening, and optionally deodorizing the starting material fats previously described, if necessary;
(B) heating the fats to a temperature above the clear melting point of the fat mixture with stirring to obtain a homogeneous molten fat composition;
(C) rapidly chilling the homogeneous molten fat composition to crystallize sufficiently for further processing;
(D) extruding the crystallized fat composition into small segments or pieces;
(E) optionally tempering the fat segments at about 85° F. to about 95° F. for up to six days (144 hours).

Liquid or unsaturated fats are first hydrogenated or hardened and optionally deodorized, if necessary, to generate a solids fat content sufficiently high to achieve the desired product solids content indices. The fats are heated, preferably with mixing, to a temperature of about 25° F. above the clear melting points of the fats to assure dissolution of all fat crystal nuclei. The heating vessel can be blanketed with an inert gas such as nitrogen to eliminate the oxidation of the fat. Excessive heating should be avoided as it is uneconomical and also could result in degradation of the fat composition.

The homogeneous molten fat composition is rapidly chilled to a temperature below the melting point of the composition to crystallize sufficiently for further processing. This is accomplished by use of a temperature controlled scraped-wall heat exchanger or other equivalent means. The crystallized fat composition can be formed into a continuous configuration such as a strand, cylinder, sheet, or the like. Apparatus to achieve the desired continuous form is conveniently attached to the cooling apparatus in a manner such that the crystallized fat is extruded from the cooling apparatus directly ino the molding or forming apparatus. A means for controlling the temperature of the molding or forming apparatus is needed to assure smooth movement of the crystallized fat without sticking or clogging the apparatus. Additionally, control of the outlet temperature of the crystallized fat within the range of about 60° F. to about 110° F. is necessary to maintain mold integrity and to adjust for the proper flow rate of material through the apparatus.

The formed fat composition can then be further chilled to complete solidification sufficient to withstand further processing without deformation of the molded shape by means of a cooling tunnel or other equivalent apparatus. A cooling tunnel comprising a brine-air heat exchanger can be employed. The continuous configuration of the fat composition is chilled by exposure to an inert gas or air having a temperature of from about 10° F. to about 70° F. for a specified time period. Usually less than 15 minutes is sufficient, with shorter times used at low temperatures within the specified range. Preferably, the cool air passes countercurrently to the molded fat in the chilling zone for efficiency and economy. The duration of exposure necessary to achieve desired product consistency is dependent upon the flow rate of the crystallized mold and its state of viscosity upon exiting from the molding apparatus. Thus, changes in the range of the molding apparatus outlet temperature necessitate a correlating adjustment of residence time in the cooling tunnel. Product leaving the cooling tunnel must be sufficiently hardened to complete processing without disintegration or deformation.

The solidified molded composition is then partitioned or formed into into small segments or pieces. As used herein, partitioning means cutting, shaping or pressing into small segments by means appropriate to the desired final shape. The segments or pieces comprise large particles, pellets, spheres, cubes, cylinders and the like. The pieces may be either substantially uniform in size and shape or irregular in size and shape. The preferred cylinder shape can be easily generated by means of temperature controlled exit tubes of the desired diameter attached to the cooling apparatus so that the crystallized material is extruded as a continuous cylinder which is then further solidified in the cooling tunnel and cut into pieces of the desired length. For example, a cutter with multiple blades that move synchronous to the continuous mold, which is transported by a conveyor belt or other appropriate means, can easily generate the desired cylindrical segments of shortening. Other cutting means can be employed suitable to the desired final shape and flow rate of product. The solid shortening segments are then packed into containers.

If desired, the crystallized fat can be partitioned or shaped as it exits from the scraped-wall heat exchanger. In this case the fat, as it exits from the molding apparatus, is cut or formed into the desired size and shape while in a less viscous state. The fat segments are then further chilled to complete solidification in a cooling tunnel or by other appropriate means. Alternately, the fat can be pressed into pellets or tablets.

Optionally, the shortening segments are tempered by heating to a temperature of about 85° F. to about 95° F. for a period of 0 to about 144 hours (up to six days). This permits transformation of the fat crystals to the higher melting thermodynmically stable beta polymorphic phase. The speed of crystal transformation is temperature dependent, with the speed becoming faster in proportion as the temperature becomes higher. For the shortenings of the present invention, a temperature range of about 85° F. to about 95° F. was found suitable. The preferred temperature range is 88° F. to 92° F. The shortening may be tempered for up to 144 hours (six days). The preferred tempering time is a minimum of 72 hours (3 days).

The solidified fat composition can be tempered prior to partitioning or forming into segments. The preferred method is to perform the partitioning prior to the tempering for greater convenience. In this case the processing can be completed all at once with tempering conducted with the product in the final shipping package.

The tempering step can be omitted entirely for some starting materials. The tempering step is not necessary if the composition after processing has a minimum solids content index of about 15% at 110° F. However, elimination of the tempering step is not the preferred mode of processing because of the desirability of being able to increase the product thermodynamic stability.

Testing Methods

A. Solids Content Index Method

The solid contents index represents the percent by weight of solids in the sample of fat at a given temperature as determined by pulsed nuclear magnetic resonance. The measurements were all determined using the general method described in Madison and Hill, J. Am. Oil Chem. Soc., 55, 328-331 (1978), hereinafter denoted PNMR, using a Praxis Pulsed NMR SFC 900 Solid Fat Analyzer. Specifically, the solids content indices were measured using the following sample preparation procedure. Fat samples were melted and added to PNMR tubes. They were melted at 140° F. and held for 30 minutes. The samples were then shaken and tempered at 80° F. for 5 minutes, 32° F. for 5 minutes, 80° F. for 30 minutes, and 32° F. for 5 minutes. The samples were tempered at 90° F.±5° F. for 0, 1, 3 or 6 days and then stored at 40° F. to prevent any further crystal phase transformations. To determine solids content indices the samples were then placed into baths of increasing temperatures, i.e., 50° F., 70° F., 80° F., 92° F., 105° F., 110° F., and 120° F. After allowing 20 minutes for equilibration at each temperature, the solids content index reading was measured in the instrument.

B. Agglomeration Test Method

The level of agglomeration was determined by assigning grading numbers of 1 to 15 to each sample, wherein 1 represented no agglomeration and the higher numbers corresponded to increasing levels of agglomeration. The fat samples, after tempering at 90° F.±5° F. in vials for 0, 1, 3 and 6 days, respectively, were removed immediately to ovens maintained at 110° F. and 120° F.±2° F. After a storage period of 48 hours at this temperature, the vials were removed and allowed to equilibrate at room temperature overnight. The samples were the agitated and graded by visual inspection. Agglomeration grades up to level 6 were considered acceptable because agglomeration was minimal and the product easily flowed from the container with shaking or tapping. Grades 1 through 4 were preferred. Grades 5 and 6 were considered marginally acceptable. Grades 7 to 15 represented unacceptable levels of agglomeration. At grades 7 and 8 an agglomerated mass of product formed and hard blows to the container were required to cause the product to break into large clumps of pellets. At higher grades the product was agglomerated sufficiently to prevent any flowability and began melting. The following grading scale was employed:

1. Product poured out easily, no agglomeration.
2. Slight shaking of container required to initiate flow.
3. Hard shaking of container required to initiate flow.
4. Light blows (tapping) of container on hard surface required.
5. Hard blows of container on hard surface required.
6. Hard blows required to break pellets apart into groups of 2 or 3 pieces.
7. Hard blows to container required to break pellets apart into groups of 4 or more.
8. Repeated hard blows required to break away a few pellets.
9. No pieces or lumps broke away from mass. Pellets have slight disfigurement.
10. Pellets melted together and disfigured, but distinguishable as pellets.
11. Product approximately 20% melted, 80% disfigured.
12. Product approximately 50% melted, 50% disfigured.
13. Product approximately 70% melted, 30% disfigured.
14. Product approximately 90% melted, 10% disfigured.
15. Product 100% melted in a liquid.

C. Beta Crystal Measurement

The percentage of beta phase crystals present in the shortening compositions was determined by X-ray diffraction using the following method. Samples were prepared by slicing three fat segments previously tempered at 90° F.±5° F. and fastening them into a 15 mm. by 20 mm. window of a 38 mm. by 38 mm. aluminum sample holder backed with transparent tape. Minimal pressure and friction was applied in sample placement to avoid heating the samples which could cause phase changes. A Phillips XRG 3100 X-ray Diffraction Spectrophotometer was employed to measure the presence of beta and beta-prime crystal phases.

D. DSC Method

The melting profiles of FIGS. 2 to 5 were generated using a DuPont 990 Thermal Analyzer with DSC, on a DuPont 910 Base. One gram of tempered sample was finely chopped and 10 mg. was weighed into a tared, covered sample cup. The DSC cell was cooled to 25° C. and the sample and reference were placed on the sample and reference thermocouples within the cell. The DSC cell was placed in the instrument which was programmed for a rise in temperature by 2° C. per minute. The temperature range output was at 2.5° C. per cm. The upper temperature limit was 70° C. (158° F.).

E. Food Quality Testing

The compositions were evaluated individually in test comparisons with food prepared using the current leading solid vegetable shortening. Two fry kettles were filled, one with the claimed shortening segments and the other with a leading solid shortening. The kettles were then heated to cooking temperature to melt the shortening. Breaded chicken pieces were fried in each and held at room temperature for 15 minutes to allow cooling and fat crystallization on the surface of the food. Panelists tasted one sample in the morning and the opposite sample that afternoon and evaluated each sample in five categories comprising breading crispness, texture relating to chewing quality, oiliness or greasiness, mouthfeel aftertaste relating to fat, and overall acceptability. Each category was rated on a scale of 1 to 9 with 5 indicating the limit of acceptability for each. A rating below 5 indicated a negative reaction to the product, and was considered unacceptable. A rating of 5 or above was considered acceptable. A preferred product was one with a rating not statistically significantly worse at a 95% confidence limit than the reference leading solid shortening. The following scale was used for each category evaluated.
1. Dislike extremely.
2. Dislike very much.
3. Dislike moderately.
4. Dislike slightly.
5. Neither like nor dislike.
6. Like slightly.
7. Like moderately.
8. Like very much.
9. Like extremely.

Statistical evaluation of the data from the panelists demonstrated that the pourable solid shortenings of the present invention could be used to prepare food of acceptable organoleptic quality in all categories. The high solids content necessary to withstand storage at 110° F. without agglomeration did not impart a waxy or greasy taste to the food.

EXAMPLE 1

Seven shortening compositions were prepared from starting materials comprising deodorized soybean oil hardened by hydrogenation to solids content indices at 110° F. of 53.8%, 48.8%, 36.9%, 2.7%, 20.4%, 20.8% and 5.1%. Each of the soybean oils was processed individually in the following manner. The soybean oil was first heated to a temperature of about 140° F. to 160° F. in a 250 lb. capacity vessel with mechanical agitation. The soybean oil was then pumped to a scraped-wall heat exchanger, cooled by brine or chilled water, for rapid chilling to promote crystallization. The crystallized fat was extruded from the scraped-wall heat exchanger through a heated round tube with an interior diameter of about ¼ inch. The outlet temperature was maintained within a range of about 60° F. to 115° F. Motor-driven conveyor belts transported the continuous cylindrical molded fat to a cooling tunnel where it was contacted with a countercurrent flow of cold air moving at a rate of about 700 ft./min., maintained at a temperature of less than 32° F., preferably 10° F. to 15° F., to further solidify the fat. Residence time of the molded fat within the cooling tunnel was an average of 5 to 90 seconds. The continuous cylinder of solidified fat was then cut into segments of approximately ⅜ inch in length by means of a multiple blade cutter belt in a manner such that the cutting belt and fat cylinder moved synchronous to each other. The shortening segments were sampled and tempered for testing as previously described. The solids content indices, agglomeration level, and percent of beta phase present were determined after 0, 1, 3 and 6 days of tempering at 90° F.±5° F., respectively. At each tempering time tested, the solids content indices were determined for each composition at 50° F., 70° F. 80° F., 92° F., 105° F., 110° F. and 120° F. Data is presented in Tables I-A through I-G.

Tables I-A through I-G demonstrate that all compositions except I-G were rated acceptable in the agglomeration testing at 110° F. Composition I-G agglomerated unacceptably and has a solids content index of 11% at 110° F. after six days tempering. This is within the unacceptable range for agglomeration of less than 15% solids content index at 110° F. At 120° F. only compositions I-A and I-B were acceptable without tempering. All remaining compositions except I-G were acceptable at 120° F. after tempering.

Coposition I-A represents unacceptable food quality as indicated by the unacceptable grading for one category, mouthfeel. This composition has a solids content index of 80% at 92° F. The solids content index at zero days tempering is the figure considered with regard to food quality because melting of the shortening for cooking destroys any tempering effect on the composition. Compositions I-B and I-C were acceptable in all categories evaluated but had a negative statistically significant difference based on a 95% confidence limit from the reference shortening. These compositions have a solids content index of 78% and 66% at 92° F., respectively, and represent acceptable but not preferred compositions with regard to waxiness. Compositions I-E and I-F were acceptable in all categories evaluated with no negative statistically significant difference based on a 95% confidence limit from the reference shortening. These compositions each have a solids content index of 47% at 92° F. and are within the preferred range of 63% or less for waxiness.

As expected, the percentage of beta phase crystals present increased as the tempering time increased in all cases. Tempering times of 0, 1, 3 and 6 days were compared. The product solids content index after tempering for 3 days (72 hours) was up to about 5% higher than the solids content indices after tempering for only 1 day (24 hours). Tempering for an additional 72 hours for a total of 144 hours (6 days) increased the solids content indices of the product by less than 2% in all cases, and usually by less than 1%. Thus, the preferred tempering time is a minimum of 72 hours (3 days).

TABLE I-A

| | | | | | | | | | | |
|---|---|---|---|---|---|---|---|---|---|---|
| Hardened Soybean Oil Starting SCI of 53.8 at 110° F. | | | | | | | | | | |
| Days Tempered at 90° F. | % B | Agglomeration* | | % Solid Content Index | | | | | | |
| | | 110° F. | 120° F. | 50° F. | 70° F. | 80° F. | 92° F. | 105° F. | 110° F. | 120° F. |
| 0 | 2.6 | A | A | 92.7 | 87.6 | 84.4 | 80.0 | 63.4 | 53.8 | 34.2 |
| 1 | 33.4 | A | A | 91.7 | 85.4 | 82.4 | 80.0 | 71.5 | 64.7 | 46.6 |
| 3 | 77.9 | A | A | 92.0 | 85.8 | 82.3 | 80.0 | 75.8 | 72.2 | 47.8 |
| 6 | 83.9 | A | A | 92.1 | 85.8 | 82.2 | 79.8 | 76.8 | 72.8 | 47.8 |

| | Food Quality Testing | |
|---|---|---|
| Category | Claimed Shortening* | Negative Significant Difference from Leading Solid Shortening |
| Breading Crispness | A | No |
| Texture | A | No |
| Oily/Greasy | A | No |
| Mouthfeel | U | Yes |

TABLE I-A-continued

| | | |
|---|---|---|
| Overall | A | No |

*A = Acceptable
U = Unacceptable

TABLE I-B

Hardened Soybean Oil
Starting SCI of 48.8 at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 25.5 | A | A | 91.6 | 85.5 | 81.3 | 77.7 | 58.9 | 48.8 | 34.8 |
| 1 | 74.8 | A | A | 92.0 | 84.1 | 79.8 | 76.9 | 69.2 | 64.8 | 37.7 |
| 3 | 75.8 | A | A | 91.6 | 84.5 | 79.9 | 76.8 | 72.4 | 67.5 | 39.4 |
| 6 | 86.2 | A | A | 91.4 | 84.6 | 79.6 | 76.5 | 72.7 | 66.5 | 40.1 |

*A = Acceptable
U = Unacceptable

Food Quality Testing

| Category | Claimed Shortening* | Negative Significant Difference from Leading Solid Shortening |
|---|---|---|
| Breading Crispness | A | No |
| Texture | A | No |
| Oily/Greasy | A | No |
| Mouthfeel | A | Yes |
| Overall | A | Yes |

*A = Acceptable
U = Unacceptable

TABLE I-C

Hardened Soybean Oil
Starting SCI of 36.9 at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 4.3 | A | U | 86.9 | 77.0 | 71.4 | 66.0 | 45.2 | 36.9 | 24.6 |
| 1 | 57.1 | A | A | 87.4 | 76.1 | 69.6 | 64.5 | 54.3 | 49.6 | 25.4 |
| 3 | 79.6 | A | A | 85.5 | 77.5 | 69.6 | 64.8 | 59.2 | 53.4 | 26.6 |
| 6 | 85.1 | A | A | 88.1 | 77.3 | 69.3 | 64.4 | 59.8 | 52.0 | 26.8 |

Food Quality Testing

| Category | Claimed Shortening* | Negative Significant Difference from Leading Solid Shortening |
|---|---|---|
| Breading Crispness | A | No |
| Texture | A | No |
| Oily/Greasy | A | No |
| Mouthfeel | A | Yes |
| Overall | A | No |

*A = Acceptable
U = Unacceptable

TABLE I-D

Hardened Soybean Oil
Starting SCI of 24.7 at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 6.1 | A | U | 81.8 | 71.2 | 64.7 | 57.0 | 32.0 | 24.7 | 13.2 |
| 1 | 47.7 | A | A | 80.4 | 70.2 | 60.4 | 52.0 | 41.2 | 36.8 | 13.9 |
| 3 | 67.9 | A | A | 83.7 | 71.4 | 60.4 | 51.3 | 45.0 | 37.0 | 14.6 |
| 6 | 73.6 | A | A | 84.1 | 71.6 | 59.7 | 51.0 | 44.4 | 35.4 | 13.9 |

*A = Acceptable
U = Unacceptable

TABLE I-E

Hardened Soybean Oil
Starting SCI of 20.4 at 110° F.

Days Tempered    Agglomeration*    % Solid Content Index

TABLE I-E-continued

| at 90° F. | % B | 110° F. | 120° F. | 50° F. | 70° F. | 80° F. | 92° F. | 105° F. | 110° F. | 120° F. |
|---|---|---|---|---|---|---|---|---|---|---|
| 0 | 10.3 | A | U | 77.2 | 63.0 | 54.9 | 46.8 | 26.8 | 20.4 | 10.2 |
| 1 | 51.1 | A | U | 78.1 | 61.0 | 51.8 | 44.5 | 32.1 | 26.4 | 11.2 |
| 3 | 67.3 | A | U | 79.8 | 65.6 | 53.1 | 44.6 | 35.6 | 30.8 | 11.6 |
| 6 | 75.4 | A | A | 81.6 | 65.7 | 52.4 | 44.7 | 38.4 | 31.0 | 12.2 |

Food Quality Testing

| Category | Claimed Shortening* | Negative Significant Difference from Leading Solid Shortening |
|---|---|---|
| Breading Crispness | A | No |
| Texture | A | No |
| Oily/Greasy | A | No |
| Mouthfeel | A | No |
| Overall | A | No |

*A = Acceptable
U = Unacceptable

TABLE I-F

Hardened Soybean Oil Starting SCI of 20.8 at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 31.0 | A | U | 67.8 | 58.2 | 53.4 | 46.6 | 26.8 | 20.8 | 10.0 |
| 1 | 54.4 | A | U | 68.5 | 57.1 | 49.7 | 42.5 | 36.5 | 28.7 | 10.9 |
| 3 | 64.0 | A | U | 69.5 | 58.1 | 50.4 | 42.9 | 36.1 | 29.1 | 11.1 |
| 6 | 72.0 | A | U | 69.9 | 57.6 | 49.8 | 42.1 | 35.7 | 28.7 | 11.2 |

Food Quality Testing

| Category | Claimed Shortening* | Negative Significant Difference from Leading Solid Shortening |
|---|---|---|
| Breading Crispness | A | No |
| Texture | A | No |
| Oily/Greasy | A | No |
| Mouthfeel | A | No |
| Overall | A | No |

*A = Acceptable
U = Unacceptable

TABLE I-G

Hardened Soybean Oil Starting SCI of 5.1 at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 11.2 | U | U | 65.6 | 50.8 | 42.2 | 28.5 | 9.9 | 5.1 | 0.6 |
| 1 | 37.9 | U | U | 65.6 | 50.6 | 37.6 | 27.3 | 13.8 | 9.9 | 1.2 |
| 3 | 51.0 | U | U | 70.6 | 50.8 | 37.4 | 25.4 | 16.2 | 12.0 | 1.2 |
| 6 | 60.6 | U | U | 71.4 | 52.4 | 37.4 | 24.7 | 17.2 | 10.9 | 0.5 |

*A = Acceptable
U = Unacceptable

EXAMPLE 2

Three shortening compositions were prepared from starting materials comprising deodorized soybean oils of two differing iodine values, blended to solids content indices of 28.7%, 21.7%, and 17.9% at 110° F. Each of the blends was processed individually as described in Example 1. The solids content indices, agglomeration level, and percent beta phase present were determined after tempering at 90° F.±5° F., for 0, 1, 3 and 6 days, respectively. The data is summarized in Tables II-A throug II-C below.

All three compositions were rated acceptable as resisting agglomeration at 110° F. The solids content indices were all above 15% at 110° F. with no tempering, and ranged from 23% to 37% after 3 or 6 days tempering. At 120° F. only composition II-A was rated acceptable with no tempering. Composition II-C agglomerated unacceptably at 120° F. even after tempering.

One of the blended soybean oil shortenings of Exaple 2 was subjected to sensory evaluation food testing. Statistical evaluation of the data demonstrated that no degradation of the organoleptic quality of the food occurred due to the high solids content of the claimed shortening, and performance was comparable to the current leading brand of solid shortening in all categories evaluated. The composition had a solids content index of 46% at 92° F. and is in the preferred range for waxiness. This composition demonstrates that blending starting materials of different iodine values without hydrogenation can generate preferred shortenings.

TABLE II-A

Blended Soybean Oils
Starting SCI of 28.7% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 28.5 | A | A | 82.3 | 71.1 | 64.4 | 56.8 | 34.0 | 28.7 | 15.0 |
| 1 | 76.7 | A | A | 84.2 | 70.0 | 61.2 | 53.1 | 46.1 | 37.3 | 16.4 |
| 3 | 81.8 | A | A | 83.4 | 70.6 | 61.0 | 53.3 | 46.3 | 37.3 | 16.5 |
| 6 | 86.0 | A | A | 84.0 | 71.0 | 60.9 | 53.1 | 44.6 | 37.1 | 16.4 |

*A = Acceptable
U = Unacceptable

TABLE II-B

Blended Soybean Oils
Starting SCI of 21.7% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 11.3 | A | U | 66.4 | 58.2 | 53.4 | 46.3 | 25.6 | 21.7 | 9.8 |
| 1 | 65.5 | A | U | 66.8 | 58.6 | 50.6 | 43.0 | 35.8 | 28.4 | 11.0 |
| 3 | 79.5 | A | U | 69.4 | 57.6 | 50.0 | 42.8 | 35.8 | 28.6 | 11.0 |
| 6 | 84.6 | A | A | 69.0 | 57.8 | 49.7 | 42.3 | 35.8 | 27.6 | 10.1 |

Food Quality Testing

| Category | Claimed Shortening* | Negative Significant Difference from Leading Solid Shortening |
|---|---|---|
| Breading Crispness | A | No |
| Texture | A | No |
| Oily/Greasy | A | No |
| Mouthfeel | A | No |
| Overall | A | No |

*A = Acceptable
U = Unacceptable

TABLE II-C

Blended Soybean Oils
Starting SCI of 17.9% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 11.7 | A | U | 78.3 | 64.5 | 55.9 | 44.5 | 21.9 | 17.9 | 6.4 |
| 1 | 70.2 | A | U | 80.8 | 63.7 | 52.3 | 41.2 | 32.1 | 23.1 | 7.5 |
| 3 | 81.3 | A | U | 79.5 | 64.4 | 52.1 | 40.5 | 31.9 | 23.3 | 7.0 |
| 6 | 86.3 | A | U | 80.3 | 64.9 | 51.9 | 40.8 | 31.6 | 23.1 | 7.1 |

*A = Acceptable
U = Unacceptable

EXAMPLE 3

Four shortening compositions were prepared from starting materials comprising hardened sunflower seed oil with solids content indices of 35.8%, 12.0% and 0.2% at 110° F. Each of the compositions was processed individually as described in Example 1. The solids content indices, agglomeration level and percent beta phase present were determined after tempering at 90° F.±5° F. for 0, 1, 3 and 6 days, respectively. The data is summarized in Tables III-A through III-D.

Compositions III-A, III-B and III-C were rated acceptable in agglomeration testing at 110° F. after tempering for one day, at which time each had a solids content index of 15% or above. Composition III-D agglomerated unacceptably even after six days tempering with a solids content index of only 5%. Only composition III-A was rated acceptable at 120° F. after tempering. Food quality testing was not conducted because each of the compositions had a solids content index at 92° F. of less than 78%. The levels of beta phase crystals present in these shortenings quickly increased with even one day's tempering, and attained a level of about 80% or above, usually 90% or above, by the end of the tempering period.

TABLE III-A

Hardened Sunflower Seed Oil
Starting SCI of 35.3% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
| --- | --- | --- | --- | --- | --- | --- | --- | --- | --- | --- |
| 0 | 31.2 | A | U | 87.2 | 78.6 | 73.1 | 65.2 | 38.7 | 35.3 | 17.8 |
| 1 | 93.6 | A | A | 86.0 | 78.3 | 70.0 | 61.1 | 53.7 | 43.6 | 19.0 |
| 3 | 94.3 | A | A | 87.2 | 78.6 | 69.8 | 61.1 | 53.9 | 44.3 | 19.0 |
| 6 | 94.4 | A | A | 86.8 | 78.3 | 69.2 | 60.3 | 53.0 | 44.4 | 19.4 |

*A = Acceptable
U = Unacceptable

TABLE III-B

Hardened Sunflower Seed Oil
Starting SCI of 15.3% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
| --- | --- | --- | --- | --- | --- | --- | --- | --- | --- | --- |
| 0 | 24.8 | U | U | 81.6 | 70.3 | 61.4 | 45.5 | 16.8 | 15.3 | 3.2 |
| 1 | 90.2 | A | U | 81.2 | 70.1 | 58.6 | 43.0 | 31.3 | 21.1 | 2.9 |
| 3 | 92.8 | A | U | 82.6 | 70.6 | 58.8 | 43.3 | 31.1 | 22.1 | 3.5 |
| 6 | 93.4 | A | U | 82.2 | 70.1 | 58.1 | 42.5 | 31.0 | 21.5 | 3.3 |

*A = Acceptable
U = Unacceptable

TABLE III-C

Hardened Sunflower Seed Oil
Starting SCI of 12.0% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
| --- | --- | --- | --- | --- | --- | --- | --- | --- | --- | --- |
| 0 | 17.4 | U | U | 77.8 | 63.5 | 53.2 | 37.4 | 11.7 | 12.0 | 1.3 |
| 1 | 82.2 | A | U | 78.4 | 65.5 | 53.6 | 37.0 | 24.8 | 15.3 | 1.9 |
| 3 | 91.6 | A | U | 79.0 | 65.4 | 52.7 | 36.3 | 23.9 | 15.6 | 1.6 |
| 6 | 89.4 | A | U | 79.1 | 65.8 | 53.2 | 36.7 | 24.5 | 16.3 | 1.8 |

*A = Acceptable
U = Unacceptable

TABLE III-D

Hardened Sunflower Seed Oil
Starting SCI of 0.2% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
| --- | --- | --- | --- | --- | --- | --- | --- | --- | --- | --- |
| 0 | 13.5 | U | U | 69.4 | 51.6 | 38.7 | 21.2 | 2.6 | 0.2 | 0.0 |
| 1 | 49.7 | U | U | 71.3 | 55.1 | 40.0 | 23.4 | 11.6 | 5.0 | 0.0 |
| 3 | 82.6 | U | U | 74.9 | 59.4 | 41.7 | 23.6 | 11.4 | 6.8 | 0.4 |
| 6 | 79.4 | U | U | 73.9 | 57.0 | 39.8 | 22.3 | 10.9 | 5.4 | 0.0 |

*A = Acceptable
U = Unacceptable

EXAMPLE 4

One shortening composition was prepared from hardened cottonseed oil with a solids content index of 13.9% at 110° F. The composition was processed as described in Example 1. The solids content indices, agglomeration levels, and percent beta phase present were deterined. The data is summarized in Table IV-A.

The product solids content index corresponding to minimal or no agglomeration at 110° F. ranged from 15.5% to 16.2% at 110° F. after tempering. The composition showed unacceptable levels of agglomeration at 120° F. The solids content index at 92° F. of 49% is well below the 78% maximum limit for acceptable food quality. The level of beta phase crystals present was much lower than the corresponding levels for the soybean oil and sunflower oil shortenings after tempering at 90° F.±5° F. for 1, 3 and 6 days. Cottonseed oil is non-beta tending and therefore not a preferred source oil with respect to agglomeration, although it can be used to prepare acceptable shortenings.

TABLE IV-A

Hardened Cottonseed Oil
Starting SCI of 13.9% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 9.6 | U | U | 79.6 | 68.0 | 60.4 | 49.4 | 23.0 | 13.9 | 0 |
| 1 | 8.3 | A | U | 78.2 | 61.2 | 50.6 | 40.9 | 26.2 | 16.2 | 0 |
| 3 | 6.3 | A | U | 79.1 | 60.6 | 49.6 | 39.3 | 26.0 | 16.1 | 0 |
| 6 | 6.6 | A | U | 78.6 | 60.8 | 49.2 | 38.8 | 27.0 | 15.5 | 0 |

*A = Acceptable
U = Unacceptable

EXAMPLE 5

Two shortening compositions were prepared from starting materials comprising hardened canola oil with solids content indices of 20.6% at 110° F. The term "canola oil" as used herein shall refer to a new variety of rapeseed oil derived through hybridization of the rapeseed to a seed low in both erucic acid and glucosinolate. The fatty acid content of canola oil as weight % is palmitic—4%, stearic—2%, oleic—60%, linoleic—20%, linolenic—10%, eicosenoic—2%, and eruici—2%. Each of the compositions was processed individually as described in Example 1. The solids content indices, agglomeration levels, and percent beta phase present were determined. The data is summarized in Tables V-A and V-B.

Composition V-A was rated acceptable in agglomeration testing at 110° F. with a solids content index of 21% if untempered and 24% after tempering. The 24% level represents the minimum limit for the preferred range as defined in the agglomeration testing. Composition V-B was agglomerated unacceptably at 110° F. Both compositions agglomerated at 120° F. The solids content indices at 92° F. of 43% and 30% were within the range designated for preferred food quality. In this instance high levels of beta phase crystals, e.g. greater than 90%, were generated after tempering for just one day. A comparison of Examples 4 and 5 illustrate that compositions with both high and low levels of beta phase crystals can be made into shortening segments with a solids content index above the minimum limit for resisting agglomeration.

TABLE V-A

Hardened Canola Oil
Starting SCI of 20.6% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 29.0 | A | U | 77.9 | 64.3 | 55.9 | 43.4 | 21.4 | 20.6 | 1.2 |
| 1 | 93.4 | A | U | 79.0 | 65.0 | 54.4 | 43.6 | 34.1 | 23.9 | 1.6 |
| 3 | 94.6 | A | U | 79.5 | 64.7 | 53.6 | 42.9 | 33.2 | 24.4 | 1.8 |
| 6 | 94.2 | A | U | 79.8 | 64.5 | 53.1 | 42.2 | 33.6 | 24.0 | 1.2 |

*A = Acceptable
U = Unacceptable

TABLE V-B

Hardened Canola Oil
Starting SCI of 12.0% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 35.2 | U | U | 69.9 | 53.9 | 43.9 | 30.4 | 16.6 | 12.0 | 4.3 |
| 1 | 91.7 | U | U | 71.9 | 55.7 | 43.4 | 32.2 | 23.0 | 14.6 | 4.5 |
| 3 | 92.0 | U | U | 72.8 | 56.0 | 43.5 | 31.6 | 22.2 | 15.3 | 3.3 |
| 6 | 91.0 | U | U | 73.2 | 54.9 | 42.0 | 30.5 | 21.7 | 13.8 | 2.9 |

*A = Acceptable
U = Unacceptable

EXAMPLE 6

Three shortening compositions were prepared from beef tallow. One composition comprised unhardended beef tallow with a solids content index of 6.4% at 110° F., and two compositions comprised hardened beef tallow with solids content indices of 42.7% and 31.3% at 110° F. Each was processed individually as described in Example 1. The solids content indices, agglomeration levels, and percent beta phase present were determined. Food quality testing was performed on one hardened composition. Tables VI-A through VI-C summarize the resultant data.

The unhardened beef tallow was found unsuitable for the present invention despite high levels of beta phase crystals because agglomeration of the shortening pellets occurred at both 110° F. and 120° F. after six days of tempering. In contrast, the hardened beef tallow shortenings were rated acceptable in agglomeration testing at 110° F. with solids content indices of 31% to 43% at 110° F. with no tempering, and of 35% to 48% at 110° F. for 3 and 6 days tempering. Composition VI-B did not agglomerate at 120° F. with or without tempering. Composition VI-C required six days tempering to resist agglomeration at 120° F.

The levels of beta crystals present in the hardened compositions remained at low levels of less than 10% despite tempering. Statistical evaluation of the food quality testing data demonstrated that no degradation of the organoleptic quality of the food occurred, and performance was comparble to the current leading brand of solid shortening in all categories evaluated. The composition tested had a solids content index of 63% at 92° F. and represents the highest limit for the preferred range. This data illustrates that use of a beta-tending fat is not necessary to generate acceptable food quality. Beef tallow, similar to cottonseed oil, is non-beta tending in character, yet can yield shortenings within the preferred area of FIG. 1.

content index of 45.8% at 110° F. The composition was processed as in Example 1 and the solids content indices, agglomeration levels, and percent beta phase present were then determined. The data is sumarized in Table VII.

The product solids content index corresponding to minimal or no agglomeration at 110° F. and 120° F. ranged from 46% to 66% at 110° F. and from 21% to 35% at 120° F., respectively. The solids content index of 77% at 92° F. is within the acceptable range for food quality. The level of beta crysals present was similar to

TABLE VI-A

Beef Tallow
Starting SCI of 6.4% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 41.1 | U | U | 49.4 | 27.8 | 23.4 | 18.0 | 9.9 | 6.4 | 0.3 |
| 1 | 76.9 | U | U | 50.1 | 29.8 | 21.7 | 18.8 | 13.5 | 9.9 | 0.2 |
| 3 | 81.4 | U | U | 48.6 | 27.1 | 19.3 | 17.4 | 13.3 | 9.7 | 0.1 |
| 6 | 80.5 | U | U | 47.9 | 27.0 | 19.5 | 16.7 | 12.5 | 9.3 | 0.0 |

*A = Acceptable
U = Unacceptable

TABLE VI-B

Hardened Beef Tallow
Starting SCI of 42.7% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 5.9 | A | A | 87.3 | 82.8 | 80.8 | 75.1 | 53.5 | 42.7 | 18.4 |
| 1 | 3.9 | A | A | 86.7 | 78.4 | 73.4 | 69.6 | 57.4 | 46.8 | 20.9 |
| 3 | 3.6 | A | A | 86.6 | 78.4 | 73.2 | 69.1 | 58.7 | 47.5 | 21.3 |
| 6 | 4.0 | A | A | 85.2 | 77.5 | 71.9 | 67.9 | 57.9 | 47.3 | 18.3 |

*A = Acceptable
U = Unacceptable

TABLE VI-C

Hardened Beef Tallow
Starting SCI of 31.3% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 9.0 | A | U | 81.0 | 73.7 | 71.6 | 63.2 | 40.9 | 31.3 | 9.6 |
| 1 | 7.8 | A | U | 81.0 | 69.3 | 62.6 | 57.5 | 44.9 | 34.4 | 11.6 |
| 3 | 8.2 | A | U | 79.4 | 68.4 | 61.8 | 56.3 | 45.0 | 34.8 | 11.6 |
| 6 | 8.6 | A | A | 78.0 | 67.7 | 60.3 | 55.5 | 44.8 | 35.2 | 10.5 |

Food Quality Testing

| Category | Claimed Shortening* | Negative Significant Difference from Leading Solid Shortening |
|---|---|---|
| Breading Crispness | A | No |
| Texture | A | No |
| Oily/Greasy | A | No |
| Mouthfeel | A | No |
| Overall | A | No |

*A = Acceptable
U = Unacceptable

EXAMPLE 7

A shortening composition was prepared comprising 96% soybean oil and 4% cottonseed oil with a solids that of the soybean oil shortenings of Example 1. The combination of non-beta tending and beta tending starting materials did not adversely affect performance.

TABLE VII

96% Soybean Oil and 4% Cottonseed Oil
Starting SCI of 45.8% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 2.4 | A | U | 91.6 | 86.1 | 82.3 | 77.1 | 57.2 | 45.8 | 21.0 |
| 1 | 44.1 | A | U | 91.3 | 82.6 | 78.2 | 74.9 | 62.6 | 52.4 | 34.7 |
| 3 | 79.9 | A | A | 90.7 | 82.9 | 78.2 | 75.0 | 67.9 | 63.3 | 36.2 |
| 6 | 83.7 | A | A | 90.4 | 83.1 | 77.8 | 75.8 | 70.3 | 65.8 | 35.2 |

*A = Acceptable
U = Unacceptable

EXAMPLE 8

A shortening composition was prepared comprising 50% soybean oil and 50% beef tallow with a solids content index of 46.6% at 110° F. The composition was processed and tested as in Example 1. Table VIII summarizes the resultant data.

The product solids content index corresponding to minimal or no agglomeration at 110° F. ranged from 47% to 51% at 110° F., and for minimal or no agglomeration at 120° F. from 23% to 25% at 120° F. This acceptable pellet integrity resulted despite a level of beta crystals present that never exceeded 3%. The solids content index of 76% at 92° F. indicates that food quality is acceptable. A blend of equal levels of beta tending and non-beta tending fats thus yield acceptable shortening compositions.

TABLE VIII

50% Soybean Oil and 50% Beef Tallow
Starting SCI of 46.6% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 2.0 | A | A | 87.3 | 83.0 | 81.2 | 76.4 | 56.4 | 46.6 | 23.2 |
| 1 | 2.4 | A | A | 87.1 | 82.7 | 75.5 | 72.1 | 60.8 | 50.1 | 25.2 |
| 3 | 2.4 | A | A | 86.4 | 79.2 | 74.5 | 70.7 | 61.4 | 50.5 | 25.3 |
| 6 | 1.8 | A | A | 86.0 | 79.2 | 73.8 | 70.6 | 61.3 | 51.3 | 25.1 |

*A = Acceptable
U = Unacceptable

EXAMPLE 9

The current leading solid shortening was processed and tested as in Example 1. The product was completely melted at 110° F. (solids content index of 0%) and thus not equivalent to the shortenings of the present invention with respect to aggomeration properties. The percent of beta phase crystals present was a low level of about 10% to 15%. Current leading shortenings of this type are often formulated to contain a high level of beta-prime crystals in order to be soft and spoonable in contrast to the relatively hard pellets yielded by the processing of the shortenings of the present invention. It is believed that shortening compositions with high melting points impart a waxy or greasy taste to food cooked therein by forming a solid coating on the food as it cools to below the high melting point. Therefore, fats with lower melting points are employed in presently available solid shortenings such as this one in order to reserve good cooking qualities. This shortening was used as the reference basis of comparison for the food quality testing of Examples 1, 2 and 6. Thus the shortenings of the present invention are unique in resisting melting and agglomeration at 110° F. to 120° F., while maintaining excellent organoleptic qualities in food cooked therein.

TABLE IX

Leading Solid Shortening
Starting SCI of 0% at 110° F.

| Days Tempered at 90° F. | % B | Agglomeration* 110° F. | 120° F. | % Solid Content Index 50° F. | 70° F. | 80° F. | 92° F. | 105° F. | 110° F. | 120° F. |
|---|---|---|---|---|---|---|---|---|---|---|
| 0 | 12.2 | U | U | 65.4 | 48.3 | 36.9 | 19.2 | 1.8 | 0 | 0 |
| 1 | — | U | U | 67.0 | 43.4 | 29.4 | 14.3 | 2.8 | 0.1 | 0 |
| 3 | 10.8 | U | U | 66.0 | 44.2 | 30.0 | 14.6 | 3.0 | 0.1 | 0 |
| 6 | 12.0 | U | U | 64.9 | 44.3 | 30.0 | 13.7 | 3.0 | 0 | 0 |

*A = Acceptable
U = Unacceptable

What is claimed is:

1. A shortening composition suitable for cooking and frying comprising a plurality of discrete pieces of pourable solid fats with solids content indices within area CGH of FIG. 1 which resist agglomeration up to 110° F. and resist development of a waxy taste in foods cooked therein, said solid fats comprising triglycerides of saturated or unsaturated monocarboxylic acids having from 10 to 28 carbon atoms.

2. The shortening composition of claim 1 with solids content indices within area KJI of FIG. 1.

3. A shortening composition suitable for cooking and frying comprising a plurality of discrete pieces of purable solid edible fats which resist agglomeration up to 110° F. and resist development of a waxy taste in foods cooked therein, said fats comprising triglycerides of saturated or unsaturated monocarboxylic acids having from 10 to 28 carbon atoms having:
  (a) a minimum solids content index of 15% at 110° F., and
  (b) a maximum solids content index of 78% at 92° F.

4. The shortening composition of claim 3 wherein the solids content index is a minimum of 24% at 110° F. and a maximum of 63% at 92° F.

5. The shortening composition of claim 3 wherein the solids content index is a minimum of 15% at 120° F. after tempering at 90° F.±5° F. for at least 72 hours, and the solids content index is a maximum of 78% at 92° F.

6. The shortening composition of claim 1 wherein the shortening is prepared from fats selected from the group consisting of vegetable fats and oils, meat fats, fish oils, nut fats, milk fats, cocoa butter, cocoa butter substitutes, and synthetic fats.

7. The shortening composition of claim 1 wherein the fats comprise triglycerides of straight chain saturated or unsaturated monocarboxylic acids having from 12 to 24 carbon atoms.

8. The shortening composition of claim 1 wherein the fats comprise triglycerides of branched chain saturated or unsaturated monocarboxylic acids having from 12 to 24 carbon atoms.

9. The shortening composition of claim 1 to which has been added at least one additive selected from the group consisting of a stabilizer, flavoring, emulsifier, anti-spattering agent, and antioxidant.

10. The shortening composition of claim 1 to which has been added a stabilizer comprising methyl silicone at a level of 0 to 10 ppm by weight of the composition.

11. The shortening composition of claim 1 wherein the plurality of discrete pieces are nonuniform in shape and size.

12. The shortening composition of claim 1 wherein the plurality of discrete pieces are substantially uniform in shape and size.

13. The shortening composition of claim 11 wherein the plurality of discrete pieces comprise cylinders with a diameter of from about ⅛ inch to about 2 inches and a height of from about ⅛ inch to about 2 inches.

14. The shortening composition of claim 12 wherein the cylinders have a diameter of about ¼ inch and a height of about ⅜ inch.

15. The shortening composition of claim 11 wherein the plurality of discrete pieces comprise spheres with a diameter of about ⅛ inch to about 1 inch.

16. The shortening composition of claim 12 wherein the spheres have a diameter of about ½ inch.

17. A shortening composition suitable for cooking and frying comprising a plurality of discrete pieces of a pourable solid edible blend of vegetable fats which resist agglomeration up to 110° F. and resist development of a waxy taste in foods cooked therein, said pieces having a solids content index of from about 25% to about 50% at 110° F., and a solids content index of from about 24% to about 50% at 92° F.

* * * * *

UNITED STATES PATENT AND TRADEMARK OFFICE
CERTIFICATE OF CORRECTION

PATENT NO. : 4,469,710
DATED : September 4, 1984
INVENTOR(S) : Ronald A. Rielley et al.

It is certified that error appears in the above-identified patent and that said Letters Patent are hereby corrected as shown below:

Col. 1, line 37, "viriety" should read -- variety -- .
Col. 4, line 13, "hydroganated" should read -- hydrogenated -- .
Col. 5, line 6, "are KJI" should read -- area KJI -- .
Col. 11, line 52, "the agitated" should read -- then agitated --.
Col. 13, line 25, "2.7%" should read -- 24.7% -- .
Col. 14, line 18, "Coposition" should read -- Composition -- .
Col. 17, line 64, "throug" should read -- through -- .
Col. 18, line 59, "Exaple" should read -- Example -- .
Col. 21, line 64, "deterined" should read -- determined -- .
Col. 23, line 50, "eruici" should read -- erucic -- .
Col. 28, lines 65-66, "purable" should read -- pourable -- .

Signed and Sealed this

Twenty-sixth Day of February 1985

[SEAL]

Attest:

DONALD J. QUIGG

Attesting Officer  Acting Commissioner of Patents and Trademarks